Figure 1:
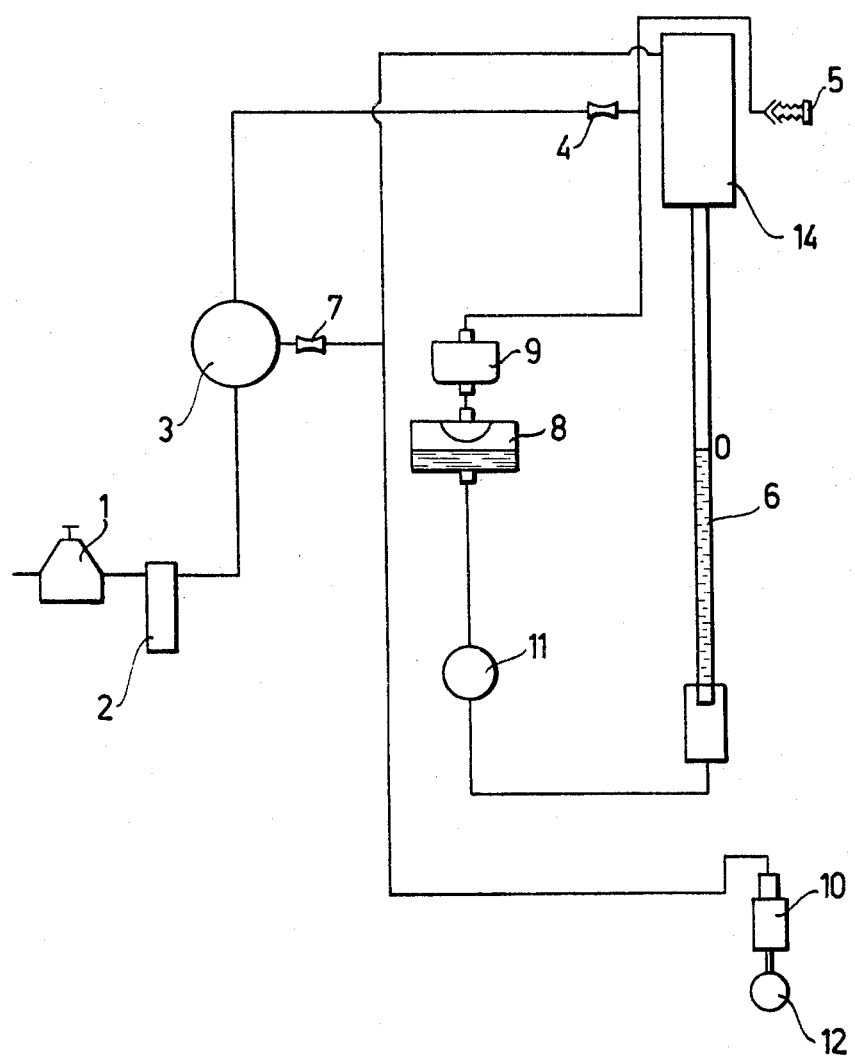

May 31, 1966     N. S. BERGLUND     3,253,456

PNEUMATIC-HYDRAULIC MEASURING DEVICE

Filed July 8, 1963                                          2 Sheets-Sheet 1

May 31, 1966   N. S. BERGLUND   3,253,456
PNEUMATIC-HYDRAULIC MEASURING DEVICE
Filed July 8, 1963   2 Sheets-Sheet 2
FIG.2
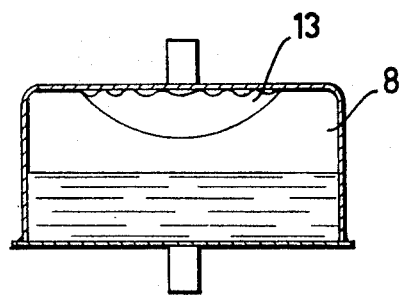
FIG.3
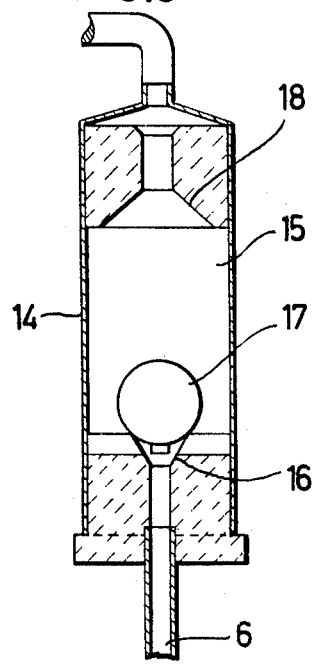
FIG.5
FIG.4
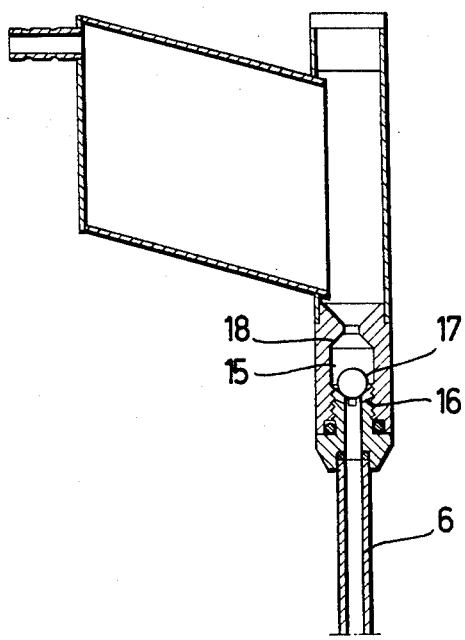
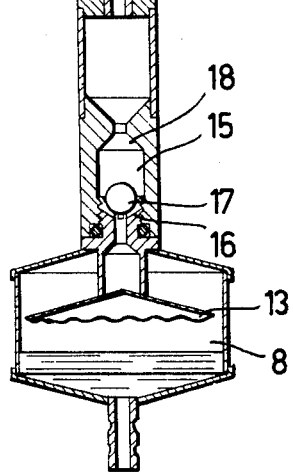

United States Patent Office 3,253,456
Patented May 31, 1966

3,253,456
PNEUMATIC-HYDRAULIC MEASURING DEVICE
Nils Sture Berglund, Nacka, Sweden, assignor to Ingenjorsfirma A. Alfredeen AB, Bandhagen, Sweden, a company of Sweden
Filed July 8, 1963, Ser. No. 293,398
Claims priority, application Sweden, July 30, 1962,
8,341/62
5 Claims. (Cl. 73—37.5)

This invention relates to a pneumatic-hydraulic measuring device wherein liquid in a manometric tube is balanced between two air streams, one of the said air streams acting upon the liquid and communicating via a control valve with the atmosphere, the other of the said air streams acting upon the liquid and communicating with the atmosphere via a transmitter means (measuring valve) actuated by the workpiece to be measured, a control valve with the atmosphere, the other of the workpiece appear directly as differences of the liquid level in the manometric tube.

Pneumatic measuring instruments of the aforesaid type are now used to a rising extent in mechanical industry.

Such known measuring instrument comprises as the basis of the pneumatic system an element, viz, a diaphragm housing with a diaphragm.

The diaphragm is considered to be the weakest point in the system, due to the fact that a diaphragm, on pure principle, reproduces pressure changes occurring in the pneumatic part of the system in an incomplete and deficient manner. This, in its turn, affects the transfer of the pressure change to the hydraulic part and causes considerable, if not insurmountable, difficulties for obtaining agreement between the functional deflections of the diaphragm and the changes of the measuring indicator. The aim is to make linear pressure changes taken up by the sensing means of the transmitter result in linear variations shown on the measuring indicator. This aim, however, is not achieved by using a diaphragm, which constitutes one of the greatest disadvantages of same.

All shortcomings due to the employment of a diaphragm can be eliminated by the solution which is the subject matter of this invention. Said invention has as its principle that the pneumatic-hydraulic system operates entirely without a diaphragm.

For illustrating the full scope of the problem, the following disclosure gives first an explanation of what will happen in a pneumatic-hydraulic system of conventional type when the diaphragm is removed: The known system operates at a feeding pressure of 0.2 kg./cm.$^2$–0.6 kg./cm.$^2$. In most cases, the feeding pressure amounts to 0.3 kg./cm.$^2$. The measuring indicator, most usually a liquid column, allows variations of the manometric level of at maximum 300 mm. water column, i.e. 0.03 kg./cm.$^2$. The whole pneumatic-hydraulic system, thus, is based within the pressure drop limits of 0.03 kg./cm.$^2$ or, in other words, a pressure drop of ±0.015 kg./cm.$^2$ referring to a feeding pressure of 0.3 kg./cm.$^2$.

As long as nothing happens along all lines and within the system proper, such a balance may operate satisfactorily. However, if there is some leakage in any point of the pneumatic system, or if there occurs somewhere a break in a hose or in a hose connection, the air stream rushes with full pressure $P=0.3$ kg./cm.$^2$ to the hydraulic part of the system. As a result thereof, the liquid is immediately given the tendency of jumping up to 3000 mm. level which, howeverw, is absolutely impossible as the water column has a maximum variation capacity of 300 mm. Consequently, the liquid rushes out of the hydraulic system into the hoses.

The reaction will be the same when a hose connection is intentionally disconnected, in order, for example, to change the flow direction in the measuring device.

In the said two cases, the hydraulic part of the system is emptied entirely and all of the liquid amount is pushed out of the measuring device. As a rule, the necessary refilling cannot be made by the user in question, but the measuring device in its entirety has to be sent to the manufacturer or to a service-shop authorized by the manufacturer where the equipment required for refilling is available.

All of the aforesaid drawbacks are overcome by using the device according to the invention. The said device will be described in greater detail in the following, reference being had to the accompanying drawing whereof FIG. 1 shows a schematic assembly of the measuring device, FIG. 2 shows a pressure box comprised in the system, FIG. 3 shows a special valve preventing the outflow of liquid due to pressure waves or the like, FIG. 4 shows an alternative embodiment of the pressure box combined with a decompression chamber, and FIG. 5 shows another embodiment of a valve combined with a container for collecting the liquid in the event of possible pressure shocks.

Compressed air of a pressure of 6 kg./cm.$^2$ is supplied through pressure governor 1 used for setting the desired feeding pressure for the measuring device. After the reduction of the pressure in pressure governor 1, for example to a feeding pressure of 0.3 kg./cm.$^2$, the air passes through an air filter 2 whereby remaining impurities in the air and water particles are removed. Thereafter, the air is directed to the distributor 3 whereafter it is divided into two air streams, whereof one flows through a throttling nozzle 4 to a branching dividing the said air stream into two branches one of which communicates with the atmosphere via a control valve 5 and the other of said branches continues to the decompression chamber 9 of the pressure box 8.

The second of the aforementioned air streams flows from the air distributor via a throttling nozzle 7 to the upper end of a manometric tube 6 and to the transmitter means 10 which, in principle, is constructed like an air valve comprising a throttling body which covers a throughflow opening more or less. When said opening is fully open, the said air branch communicates with the atmosphere. (The transmitter means 10 can alternatively be connected with the system in order to work also with a reversed direction of the flow in the pneumatic part of the system. The reversal of the flow direction can be effected either through a special four way valve or, in a simpler way, by changing over the respective air duct between the decompression chamber 9 and a reservoir 14.) The pressure box 8 disposed between the hydraulic and pneumatic parts of the system is to its half filled with coloured water which via a line communicates with the lower portion of the manometric tube 6. Thus, even said tube is to its half filled with liquid. A condition of the operability of the measuring device of the present invention is that pressure box 8 shall at all times contain liquid. In the line communicating between the bottom of pressure box 8 and the lower portion of manometric tube 6, a means 11 for maintaining the liquid column under certain periods of the measuring process may be provided. The measuring process is carried out in a manner as it is usual for such measuring devices.

The work-piece 12 having nominal size, the control valve 5 is adjusted such, that the liquid surface in the tube is on the same level as the zero mark 0. Upon deviations from the nominal size, the liquid column surface changes its height responsive to the marks and size of the deviations. Rapid changes of the liquid pressure in the pneumatic part of the system which may occur during the measuring operations, may possibly cause too vigorous liquid movements in the tube and within pressure box 8. Such movements are, however, repulsed by a decompression chamber 9 adapted to dampen the air inflow in connection with establishing balance between the two branches of the air stream after the throttling nozzle 4. For effecting a quiet liquid surface in the pressure box, said box is preferably provided with a special means 13 secured in the cover of the box and adapted to decelerate by friction the speed of the air stream.

A measuring device of the above-described type not only operates normally and satisfactorily during normal measuring operations but also masters vigorous pressure changes in an effective manner.

In order to prevent rapid changes of the liquid as they may occur at the occasions above referred to, the upper portion of the glass tube 6 is provided with a special reservoir 14. The principle of said means appears from FIG. 3 and a modification thereof is shown in FIG. 5. Said means comprises a chamber 15 enveloping a valve body 17 which normally is supported on a seat 16. Grooves, channels or the like formed between the seat 16 and the valve body 17 render it possible that at normal pulsations in the system the liquid can pass below the valve body. The valve body 17 is, however, of lighter weight than the liquid, which makes that at vigorous pressure changes the said body floats up, thereby sealing against a valve seat 18 disposed in the upper portion of the chamber 15. As appears from the drawing, the valve body 17 may be shaped like a ball, either hollow or filled with some material which gives the ball as a whole a specific gravity lower than that of the liquid. FIG. 5 shows how the chamber 15 at its upper end may be formed with a container adapted to collect the liquid, if the valve body 17 would fail in sealing effectively against the upper valve seat 18.

In its most simple construction, the pressure box may be a box provided with a lower connection for a liquid line and an upper connection for an air duct. Within the pressure box 8, there is arranged a means 13 for damping the air stream. In certain cases, however, it may be preferable to provide also the upper portion of the pressure box with a valve like valve 15, adapted to prevent the liquid from flowing out the rear way into the pneumatic system. The said valve resembles, in principle, the aforementioned valve 15 at the upper end of the glass tube 6. In FIG. 4, the damping means 13' for the air stream is, however, constructed in a different manner than shown in FIG. 2. A valve 15 disposed above the pressure box is intended to limit the liquid movements.

The invention is, of course, not restricted to the embodiment described above and illustrated on the accompanying drawing, but may be modified in various ways within the scope of the following claims.

What I claim is:

1. A pneumatic-hydraulic measuring device wherein liquid in a manometric tube is balanced between two air streams, one of the said air streams acting on the liquid and communicating via a control valve with the atmosphere, the other of the said air streams acting on the liquid and communicating with the atmosphere via a transmitter means actuated by the workpiece to be measured in such a manner that deviations measured on the workpiece appear as differences of the liquid level in the manometric tube, wherein between the hydraulic and pneumatic parts of the system is provided a pressure box, the lower half of which is filled with liquid and the upper half with gas, said filling of liquid in said pressure box presenting an unobstructed free surface to the gas thereabove, and further characterized in that a decompression chamber is interposed in the air stream communicating with the pressure box so that vigorous changes in the system are damped.

2. A pneumatic-hydraulic measuring device as defined in claim 1, further characterized in that the upper end of the manometric tube is formed with a chamber enveloping a valve normally open to passage of liquid at all normal pulsations, but adapted to close the throughflow of liquid through the chamber in the event of possible pressure waves.

3. A pneumatic-hydraulic measuring device according to claim 2, wherein said valve comprises a valve body with a specific gravity lower than that of the liquid and supported by a generally conical seat, said seat provided with grooves, channels or the like rendering liquid or air possible to pass along the valve body at normal pulsations, and in the event of vigorous liquid movements floating up to seal against an upper second and similar generally conical seat facing towards the first seat.

4. A pneumatic hydraulic measuring device according to claim 3, further characterized in that the chamber at its top portion is provided with a container of such dimensions to accommodate the whole liquid amount of the hydraulic system, if the valve body fails to seal effectively against the upper seat.

5. A pneumatic hydraulic measuring device according to claim 3, characterized in that the valve body is a ball.

References Cited by the Examiner

UNITED STATES PATENTS

| 1,882,314 | 10/1932 | Burt | 137—533.11 X |
| 2,019,066 | 10/1935 | Balsiger. | |
| 2,589,251 | 3/1952 | Heinz | 73—37.5 |

FOREIGN PATENTS

| 842,541 | 3/1939 | France. |
| 1,027,076 | 5/1953 | France. |
| 801,972 | 9/1958 | Great Britain. |
| 903,120 | 8/1962 | Great Britain. |

DAVID SCHONBERG, *Acting Primary Examiner.*

ISAAC LISANN, *Examiner.*

F. H. THOMSON, *Assistant Examiner.*